United States Patent Office 3,338,853
Patented Aug. 29, 1967

3,338,853
EPOXIDIZED COPOLYMERS OF BUTADIENE POLYMER AND UNSATURATED TRIGLYCERIDE OR UNSATURATED ACID
Edward William Duck and Paul Simmons, Dibden, Purlieu, Hythe, England, assignors to The International Synthetic Rubber Company Limited, Southampton, England, a company of the United Kingdom
No Drawing. Filed Feb. 20, 1964, Ser. No. 346,110
Claims priority, application Great Britain, Feb. 25, 1963, 7,467/63
9 Claims. (Cl. 260—23.7)

This invention relates to epoxy polymeric olefins and in particular to epoxy graft copolymers of polybutadiene and unsaturated oils, and to a process for the production of such polymers.

A number of types of epoxy polymers are today in commercial production. One of these types is produced by the condensation reaction of polyhydric alcohols or phenols with epichlorohydrin, especially the reaction of bisphenol with epichlorohydrin. Since these epoxy polymers are prepared from relatively costly starting materials, they tend to be rather expensive and use in very limited in many cases where cheap materials are essential.

Another type of epoxy material consists of epoxy unsaturated oils such as linseed oil, soya bean oil and tall oil. The products obtained by hardening these materials find little use however, because the epoxy oils have insufficient epoxy groups to give the high degree of cross-linking required in such materials. Moreover they contain a high proportion of ester groups which can be hydrolysed by acid or alkali so that the cross-linked network is completely broken down. A third type of epoxy material consists of epoxidised olefins, especially epoxidised polybutadienes. These polymeric materials are of rather high viscosity unless low molecular weight polybutadienes can be used, in which case they become more expensive due to the necessity of using large amounts of expensive catalysts in the polymerization of the butadiene. Moreover polyolefins are not very compatible with polar solvents such as are required to dissolve the peracetic acid used to convert the ethylenic group to an epoxy group. This makes the manufacture of these materials rather difficult.

It has now been found that new epoxy materials can be made from graft copolymers of unsaturated oils and unsaturated polyolefins, and poly di-olefins.

According to this invention we provide an epoxy graft copolymer of an unsaturated organic oil with an unsaturated polymer of butadiene.

Also according to the invention a process for producing such an epoxy copolymer comprises expoxidising a graft copolymer of an unsaturated organic oil and an unsaturated polymer of butadiene. Such graft copolymers are the subject of our copending U.S. application Ser. No. 345,128.

The polymer used for grafting is preferably a linear polybutadiene but copolymers of butadiene with other dienic or ethylenic monomers such as isoprene, styrene, vinyl toluene, divinyl benzene, chloroprene or acrylonitrile can be used. Such polymers may vary in average molecular weight over wide limits. However it has been found that molecular weights between 2,000 and 500,000 are preferred.

Various catalysts can be employed for the polymerization of butadiene, e.g. free radical initiators, alkali metals such as sodium, Ziegler type catalysts, e.g. aluminium alkyls+transition metal compounds and organo-lithium compounds. The preferred catalysts are lithium alkyls since these give linear essentially unbranched polymers with narrow molecular weight range, absence of gel and such polymers dissolve readily. They are available commercially under the trade names "Diene" and "Intene."

There are several ways in which the graft copolymer may be formed. For example, the polybutadiene may be dissolved in the oil and the two heated together to temperatures between 50° C. and 350° C., preferably from 200–290° C., at which temperature the grafting reaction takes place. Alternatively the two materials may be dissolved in a mutual solvent and the reaction performed in this solvent of a temperature from 50–350° C., preferably 150–250° C. In this case it may be necessary to carry out the reaction under pressure. The pressure range is dependent on the boiling point of the solvent and the reaction temperature, and is generally from 1–30 atmospheres. A catalyst may be used to increase the rate of the reaction. Such catalysts are free radical initiators such as peroxide and hydroperoxides or other materials which decompose to form free radicals. The use of these catalysts enable lower reaction temperatures to be used as well as shorter reaction times. This can be particularly useful in the case of the reaction being carried out in solvent. The lower temperatures which may be used are above 50° but can usefully be lower than the above-mentioned preferred lower temperature limits. A suitable operating temperature when a catalyst is used is 130° C. The reaction time may be from ½ hr. to 48 hrs. but at the shortest time is more usually 3 hrs. or more. It is preferred that the reaction should not take more than 12 hrs., and as stated the reaction times can be reduced by the use of a catalyst.

The amount of oil which may be used in the reaction may be varied over wide limits.

In general, 5–99% of oil may be used. If desired the reaction can take place in a solvent and the use of a solvent is particularly useful when only small amounts of oil are used. However, when the amount of oil is from 80–99% oil no independent solvent is usually used and from 85–99% oil it is preferable not to use an independent solvent since the excess oil present itself acts as a solvent for the reaction. The use of a solvent is related to the viscosity of the mix. If more than 15% polybutadiene is used in the mixture it becomes too viscous to be easily stirred. In certain cases when compatibility between the polybutadiene and the oil is poor it may be necessary to use a solvent to assist dissolution even if the amount of polymer used is small. Such cases are those where the polybutadiene is a copolymer of butadiene with another monomer.

Any excess oil may or may not be removed before epoxidation of the graft copolymer but in general excess oil is not removed since removal is difficult and tedious and the presence of the oil keeps the viscosity suitably low.

The oils which may be used are a wide variety of unsaturated oils. Oils which have been found to be particularly suitable are tall oil, linseed oil, soya bean oil and marine oils, for examples cod liver and sperm oil although many others may be used including derivatives of naturally occurring oils e.g. oleic acid.

"Marine oil" as used herein means oil obtained from living matter in the sea.

A number of reagents may be used for epoxidising the graft copolymer such as peracetic acid, perbenzoic acid and other related materials known in the art for epoxidising olefins. However peracetic acid is the reagent generally preferred. Agents such as sodium acetate are frequently used to control acidity of the medium.

It has been generally found to be more convenient to carry out the epoxidation reaction in a solvent which will dissolve both the graft copolymer and the epoxidising agent. Such solvents are preferably hydro-carbons, halogenated hydrocarbons, ketones, esters or mixtures of any of these. Examples of suitable solvents are xylene, toluene, benzene, chlorobenzene, acetone, ethyl acetate and mixtures of toluene and acetone. The choice of solvent depends on the nature of the graft copolymer and particularly on it solubility in various solvents. It is also possible to carry out the reaction in an emulsion. If the material to be epoxidised in a liquid it is not necessary to use a solvent. This is particularly the case when excess of the oil is present.

The epoxy compounds obtained are of great practical use and may be hardened with poly acids, anhydrides, Friedel-Crafts catalysts and other compounds for use as casting materials, surface coatings, adhesives and many other applications.

The following examples serve to illustrate the invention.

Example 1

10 parts of Diene 35S (a commercially available polybutadiene of approximately 35 $ML_4$ at 100° C., Mooney viscosity) were dissolved in 90 parts of linseed oil and heated to 250° C., for six hours. On cooling the material was dissolved in 100 parts of toluene in a 2 litre flask equipped with stirrer, dropping funnel and thermometer. 210 g. of 40% peracetic acid containing 10 g. of sodium acetate were run in over a period of 3 hours and the temperature kept below 30° C. The mixture was kept at this temperature for a further 30 minutes and then washed once with distilled water, once with sodium hydroxide solution and once again with water. Solvent was removed under reduced pressure to leave the desired product. Analysis showed it to contain 4.31% oxirane oxygen, (determined by titration with hydrogen bromide in acetic acid).

Example 2

Example 1 was repeated except that 20 parts of Diene 35S were dissolved in 80 parts of linseed oil. The product had an oxirane oxygen content of 4.52%.

Example 3

60 parts of Diene 35S and 40 parts of linseed oil were dissolved in 500 parts xylene and 1 part of cumene hydroperoxide added. The mixture was heated to 145° C., for 10 hours. The reaction mixture was then cooled to 25° C. and 230 g. of 40% peracetic acid containing 10 g. sodium acetate were run in over a period of three hours, the temperature being kept below 30° C. The mixture was kept at this temperature for a further 30 minutes and then washed once with distilled water, once with sodium hydroxide solution and once again with water. Solvent was removed under reduced pressure to leave the desired product. Analysis showed it to contain 5.10% oxirane oxygen.

Example 4

Example 2 was repeated except that soya oil was used in place of linseed oil. Analysis showed the product to contain 4.33% oxirane oxygen.

Example 5

Example 2 was repeated except that tall oil was used in place of linseed oil. The product analysed to contain an oxirane oxygen content of 4.15%.

Example 6

Example 2 was repeated except that Diene 35NF was used in place of Diene 35S. Diene 35NF is a commercially available non-flow grade of polybutadiene of approximately 35 $ML_4$ at 100° C. Mooney viscosity.

Example 7

Example 2 was repeated except that in place of Diene 35S a sodium polymerized polybutadiene was used. This was a thick oil with a viscosity of 2000 poises at 30° C. The product had an oxirane oxygen content of 4.61%.

Example 8

Example 3 was repeated except that Diene 35S was replaced by a polybutadiene prepared using an emulsion polymerization process and a free radical catalyst. This polybutadiene had an intrinsic viscosity in benzene at 20° C., of 1.40 and the product had an oxirane oxygen content of 4.55%.

What is claimed is:

1. The epoxy copolymer product obtained by treating with a per-acid selected from the group consisting of peracetic acid and perbenzoic acid, at a temperature below about 30° C., the reaction product formed by heating together at a temperature in the range of about 50° to 350° C. from about 5 to 99% by weight, based on the total weight, of an unsaturated organic oil selected from the group consisting of tall oil, linseed oil, soya bean oil and marine oil and from about 95 to 1% by weight of a polymer selected from the group consisting of homopolymers of butadiene and copolymers of butadiene with a comonomer selected from the group consisting of isoprene, styrene, vinyl toluene, divinyl benzene, chloroprene and acrylonitrile, the said polymer having a molecular weight in the range from about 2,000 to 500,000.

2. The epoxy copolymer according to claim 1 wherein the homopolymer of butadiene is linear.

3. The epoxy copolymer according to claim 1 wherein the oxirane oxygen content of said copolymer is about 4 to 5%.

4. A process for the preparation of an epoxy copolymer comprising first reacting from 5 to 99% by weight based on the total weight, of an unsaturated organic oil selected from the group consisting of tall oil, linseed oil, soya bean oil and marine oil with from 95 to 1% by weight of a polymer selected from the group consisting of homopolymers of butadiene, and copolymers of butadiene with a comonomer selected from the group consisting of isoprene, styrene, vinyl toluene, divinyl benzene, chloroprene and acrylonitrile, said polymer having a molecular weight in the range from 2,000 to 500,000, at a temperature of 50 to 350° C. to form a copolymer, and then epoxidizing the copolymer so formed by treating it with a per-acid selected from the group consisting of peracetic acid and perbenzoic acid at a temperature below 30° C.

5. The process according to claim 4 wherein the reaction between the unsaturated organic oil and the polymer is in the presence of a free radical initiator.

6. The process according to claim 4 wherein said per-acid and said polymer are dissolved together in a solvent selected from the group consisting of hydrocarbons, halogenated hydrocarbons, ketones, esters and mixtures thereof.

7. The process according to claim 4 wherein said polymer is a linear polybutadiene.

8. The epoxy copolymer product prepared according to the process of claim 4.

9. An epoxy copolymer product prepared according to the process of claim 4 and having an oxirane oxygen content of about 4–5%.

References Cited

UNITED STATES PATENTS

| | | | |
|---|---|---|---|
| 2,485,160 | 10/1949 | Niederhauser et al. | 260—23 |
| 2,907,669 | 10/1959 | Tulk et al. | 260—23.7 |
| 3,010,976 | 11/1961 | Greenspan et al. | 260—23.7 |
| 3,022,322 | 2/1962 | Wheelock et al. | 260—94.2 |
| 3,026,279 | 3/1962 | Mozell et al. | 260—23.7 |
| 3,210,328 | 10/1965 | Kiefer | 260—348.5 |

FOREIGN PATENTS

| | | |
|---|---|---|
| 222,373 | 7/1959 | Australia. |
| 504,808 | 8/1954 | Canada. |

DONALD E. CZAJA, *Primary Examiner.*

LEON J. BERCOVITZ, *Examiner.*

R. A. WHITE, *Assistant Examiner.*